US009732877B2

(12) United States Patent
Lucchesi

(10) Patent No.: US 9,732,877 B2
(45) Date of Patent: Aug. 15, 2017

(54) JOINT LINKAGE ACTUATING MEANS FOR A VALVE

(76) Inventor: Nicola Lucchesi, Lucca (IT)

( * ) Notice: Subject to any disclaimer, the term of this patent is extended or adjusted under 35 U.S.C. 154(b) by 78 days.

(21) Appl. No.: 14/389,768

(22) PCT Filed: Apr. 2, 2012

(86) PCT No.: PCT/IT2012/000097
§ 371 (c)(1),
(2), (4) Date: Oct. 1, 2014

(87) PCT Pub. No.: WO2013/150552
PCT Pub. Date: Oct. 10, 2013

(65) Prior Publication Data
US 2015/0053878 A1   Feb. 26, 2015

(51) Int. Cl.
F16K 31/44    (2006.01)
F16K 31/52    (2006.01)
F16K 1/12     (2006.01)
F16K 5/04     (2006.01)

(52) U.S. Cl.
CPC ............... F16K 31/44 (2013.01); F16K 1/12 (2013.01); F16K 5/04 (2013.01); F16K 31/52 (2013.01)

(58) Field of Classification Search
CPC . F16K 31/44; F16K 5/04; F16K 31/52; F16K 1/12
USPC .................... 251/279, 280, 324; 137/625.33
See application file for complete search history.

(56) References Cited

U.S. PATENT DOCUMENTS

| 1,777,580 | A | * | 10/1930 | Russell ................. F16K 1/2028 251/232 |
| 2,631,613 | A | * | 3/1953 | Bergstrom ............. F16K 31/56 251/279 |
| 2,908,478 | A | * | 10/1959 | Starrett ................ F16K 31/165 251/234 |
| 3,635,239 | A | | 1/1972 | Farrer |
| 4,050,670 | A | * | 9/1977 | Borg ..................... F16K 31/145 251/14 |
| 4,533,113 | A | * | 8/1985 | Francart, Jr. .......... F16K 5/0242 137/595 |
| 4,565,210 | A | * | 1/1986 | Heine ...................... F16K 1/12 137/219 |
| 5,129,622 | A | * | 7/1992 | Van Rensburg .......... F16K 1/14 137/901 |
| 6,733,000 | B2 | * | 5/2004 | McCarty ............... F16K 31/523 251/235 |

(Continued)

FOREIGN PATENT DOCUMENTS

FR    2756351      5/1998
WO    WO02086361   10/2002

*Primary Examiner* — Craig Schneider
*Assistant Examiner* — Andrew J Rost
(74) *Attorney, Agent, or Firm* — Nwamu, P.C.

(57) ABSTRACT

The present invention concerns a control valve comprising: —A passage path for a fluid inside the valve and that puts in communication an inlet with an outlet; —An obstruction element arranged as to result mobile between a closing position, in which it obstructs the path impeding the passage of the fluid from the inlet towards the outlet, and an opening position in which it allows said passage, and; —Movement means for operating the movement of the obstruction element between said opening position and said closing position and vice-versa. In accordance with the invention, the movement means comprise a joint linkage.

3 Claims, 6 Drawing Sheets

(56) References Cited

U.S. PATENT DOCUMENTS

| | | | |
|---|---|---|---|
| 7,097,148 B2 * | 8/2006 | DeWall | F16K 31/046 137/554 |
| 8,622,368 B2 * | 1/2014 | Geiser | F16K 51/02 251/228 |
| 2013/0187071 A1 * | 7/2013 | Marocchini | F16K 31/521 251/279 |

* cited by examiner

JOINT LINKAGE ACTUATING MEANS FOR A VALVE

TECHNICAL FIELD

The present invention refers to the technical field relative to the valves for the control and interception of a fluid in a conduit.

In particular, the invention refers to a valve whose movement of the shutter, for controlling the closing and the opening of the valve itself, is operated by means of the activation of a joint linkage.

BACKGROUND ART

Control valves that are installed in conduits, generally of big size, into which a fluid under the form of gas or liquid, such as oil, circulates, have long been known.

Such valves control an opening and a closure and are generally, but not necessarily, installed for controlling the delivery flow and for managing emergency situations by intercepting the fluid or deviating it to a secondary conduit.

One type of these valves is called HIPPS (High Integrity Pressure Protection System). This type of valves are projected for having a high safety level and are employed for protecting systems from accidental over-pressure in the conduit. An application example for these types of valves is that of the installation in proximity of a containment tank into which fluid in pressure is pushed. One or more sensors register the pressure in the circuit or in the container and, in case of an excessive rising of the pressure value, control the opening of one or more of such valves which allow an outlet and therefore a sudden pressure drop.

In the background art, different documents are present that describe various solutions adopted for moving the shutter inside these valves.

One of these is, for example, mentioned in U.S. Pat. No. 4,327,757 that describes a valve provided with an inlet for the fluid, an outlet and a path that puts in communication the inlet with the outlet. Inside the path a piston is arranged coaxially with the inlet and outlet and it is mobile between a position that obstructs the path of the fluid and a position in which the fluid can freely deflow from the inlet towards the outlet. The valve connected horizontally to the conduit has an activation system of the piston constituted of a vertical stem having a dented end which engages with a corresponding helicoidal gear tooth obtained on a terminal part of a horizontal rod to which the piston (or shutter) is connected on the opposite side. The vertical rod is rotatable in the clockwise or anti-clockwise sense, thus causing, by means of the engaging of the teeth, a translation in a direction or in the opposite direction of the horizontal rod, and therefore of the piston.

This type of solution, that in fact includes the use of toothed gears, has the technical problem of suffering significant wear of the parts in contact between them. The strong acting pressures often conduct to the quick wear of the parts and therefore it is necessary to over-dimension the system to guarantee a longer duration. Moreover, this solution adapts badly to situations in which the piston must move at high opening/closing speeds. Therefore, it is not possible to have high movement speeds or vary them in an easy way without the risk of breakages of the teeth in contact between them and excessive wear.

DISCLOSURE OF INVENTION

It is therefore the aim of the present invention to provide a control valve 1 that solves at least in part said technical inconveniences.

In particular, it is the aim of the present invention to provide a control valve 1 provided with an actuation system of the piston that results quick, precise and that is subject to little wear.

It is also the aim of the present invention to provide a control valve which, the actuation force being equal, has anyway a reduced impact force of the piston at end of stroke, in such a way as to preserve it and further improve its life duration.

These and other aims are therefore obtained by the present control valve 1 as per claim 1.

The control valve, subject of this invention, comprising a passage path (4, 7', 7) for a fluid inside it and that puts in communication an inlet (2) with an outlet (3) of the valve itself. An obstruction element (40), for example in the shape of a piston or shutter, is arranged in such a way as to result mobile between a closing position, in which it obstructs the path (4, 7', 7) impeding the passage of the fluid from the inlet (2) towards the outlet (3), and an opening position, in which it allows said passage. The movement of the obstruction element (40) between said two extreme positions is operated by means of appropriate movement means (50, 100).

In accordance with the present invention, said movement means (50, 100) comprise a joint linkage (100).

Passing from a motion transmission by means of meshing gears to a transmission composed of elements connected by rotational kinematic pairs, the system benefits from a significant reduction of the frictions and consequently, less wear of the members in motion, allowing also the possibility of increasing significantly the activation speeds.

Moreover, the configuration of the linkage is such that, extending or closing itself, modifies at any one instant, during the movement of it, the force and speed of the final point connected to the piston. The kinematics of the linkage can therefore be projected in such a way as to allow the shutter to have a high initial reactivity and a subsequent deacceleration during the final closing phase. In this manner, the impact between the piston and the closing element will result much more controlled. It is not, therefore, necessary any more, as per the background art, to operate complex controls on the actuator that operates the dented wheels to control the speeds and forces of approach of the piston to its extreme stroke points but, keeping the speed of the actuator constant, it will be the linkage itself that will automatically transmit to the piston a progressively decreasing speed until closing.

Further advantages can be deduced from the dependent claims.

BRIEF DESCRIPTION OF DRAWINGS

Further characteristics and advantages of the present invention will result clearer with the following description of some of its embodiments, made to illustrate but not to limit, with reference to the annexed drawings, wherein:

FIG. 4 shows a phase wherein the piston has obstructed the path, while

DESCRIPTION OF SOME PREFERRED EMBODIMENTS

Figure 1:
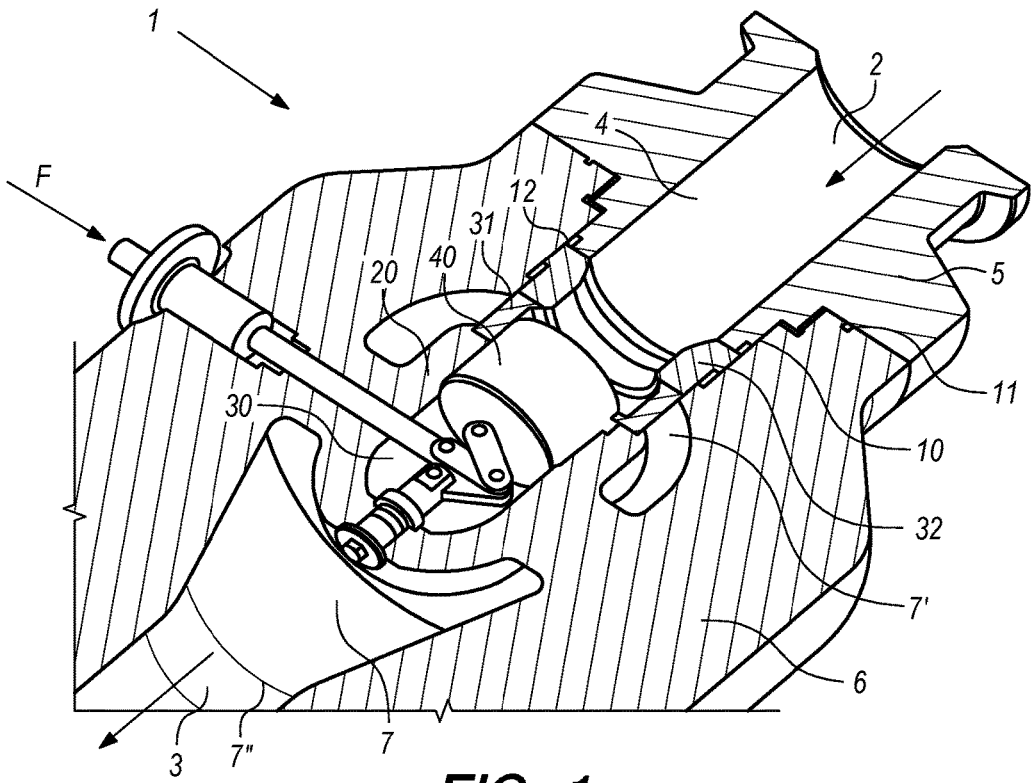
FIG. 1 shows in section the path of the fluid inside the valve and the linkage that allows the movement of the piston between the closing position and the opening one of the path.

FIG. 1 shows in section a valve 1 in accordance with the present invention.

The valve includes an inlet 2, through which a fluid enters the body of the valve 1, and an outlet 3 through which the fluid exits from the valve. The inlet and the outlet are the ends of an internal path to the valve through which the passage of the fluid from the inlet towards the outlet takes place.

In the detail of FIG. 1, the path is composed of a first part 4 and a second part 7 communicating between them and preferably arranged coaxially between them. In particular, the path 7 and the path 4 are coaxial with the longitudinal axis of the valve. Moreover, the first part 4 is, as a matter of fact, a channel obtained within the component 5 of the valve, defined with the technical term "closure". The closure 5 has preferably a substantially cylindrical shape and is screwed or bolted to the rest of the body of the valve 6. The channel 4 is therefore positioned coaxially with respect to the closure 5.

FIG. 1 shows a screw thread 10 obtained on the terminal part of the closure 5 and that cooperates with a screw thread obtained on the end of the remaining part of valve 6 in such a way as to allow to couple easily and quickly the two parts between them.

Alternatively, it is clear that it is possible to realize a connection in a different way and without the need for a cooperating screw thread, for example through a simple coupling between the parts which are fixed between them by means of bolting.

Various hermetic seals, like for example the hermetic seal 11 and 12, can be placed where deemed more appropriate in order to guarantee an optimal seal.

The second part of channel 7 is obtained on the remaining part 6 of the valve. The channel 7 is formed by an annular part 7' that joins with the rectilinear part 7" that terminates with the outlet 3.

The annularity is obtained by means of the internal conformation of said remaining part 6 of valve which includes a housing 20 (a sort of cradle) that forms a seat 30 into which to insert the kinematism of movement of the piston, as described in detail right below.

In particular, the housing 20 forms a seat or channel 30 into which a piston or shutter 40 is lodged slidingly. The seat 30 is completed by a spacer 31 and by a seal 32 having a conic surface such as to couple in the form of a tight joint with the corresponding end of closure of the piston 40.

Figure 5:
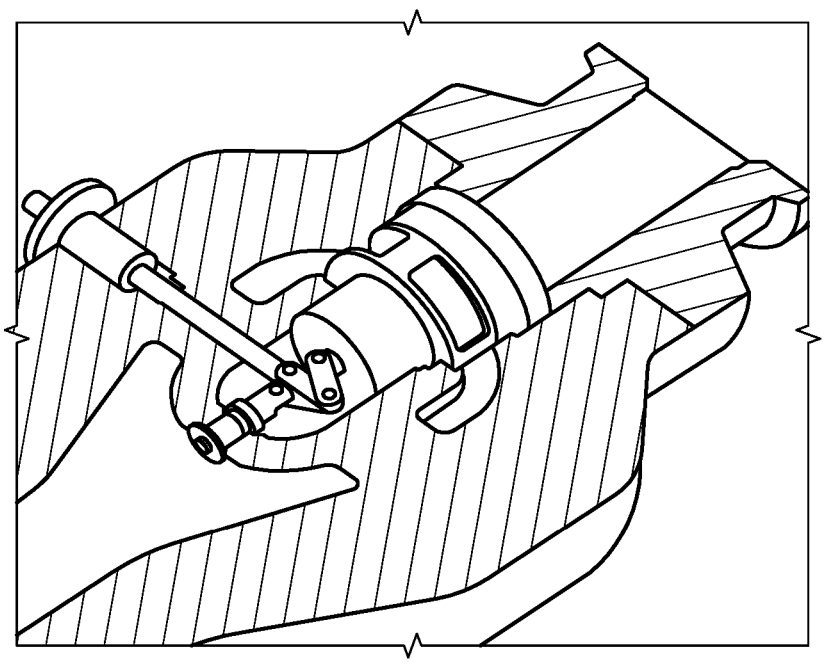
FIG. 5 shows the opening phase of the path and highlights the path covered by the circulating fluid.

The spacer 31 has naturally the shape of an annular body with lateral openings so as not to obstruct the passage of the fluid from the part 4 of path to the annular zone 7'. FIG. 5 highlights well such lateral openings.

Figure 2:
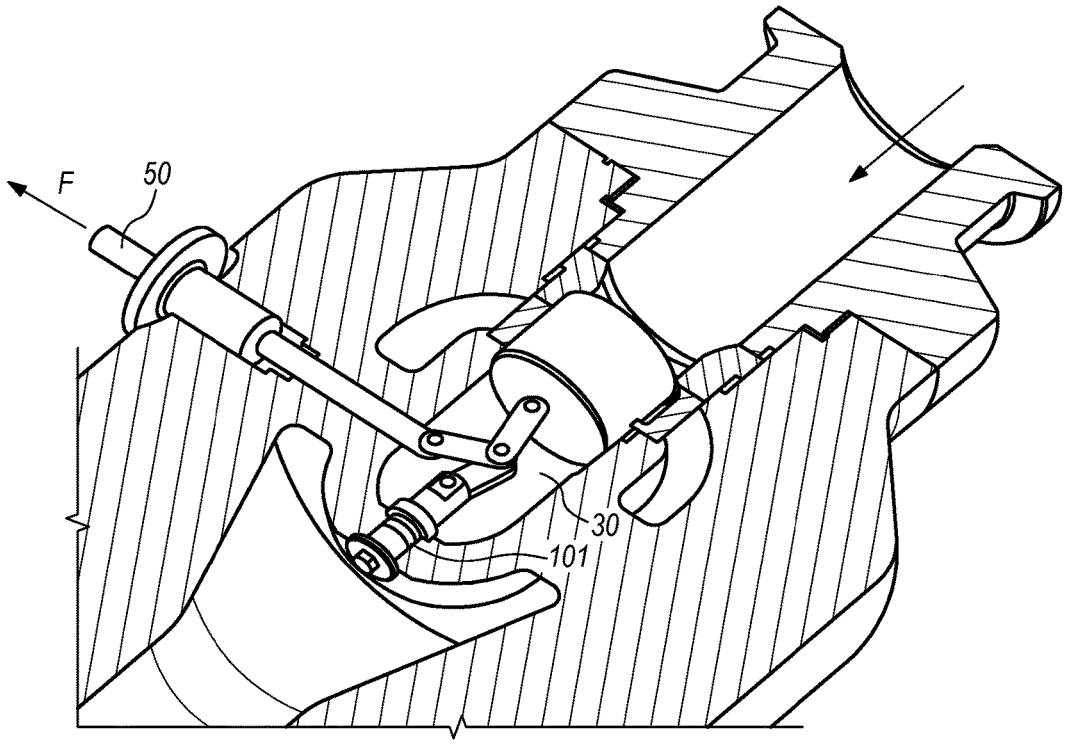
FIG. 2 describes the piston in closing position with the linkage splayed or divaricated.
Figure 4:
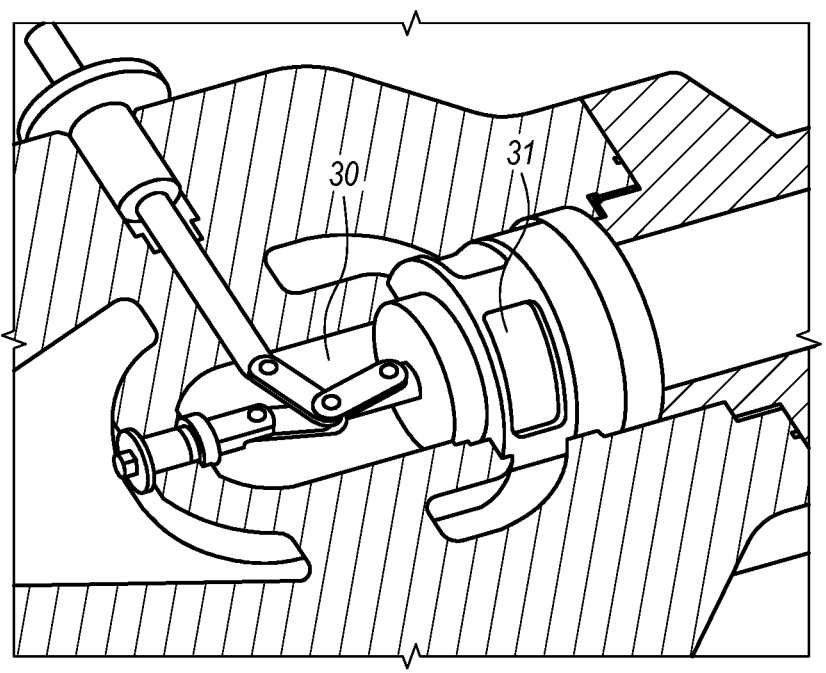

The piston can therefore slide between an opening position of the path, wherein the fluid is free to deflow from the inlet 2 towards the outlet 3 as per FIG. 1 or 5, and a closing position wherein it obstructs the channel 4 stopping against the seal 32 as per FIG. 2 or 4.

Going further into the descriptive detail of said kinematism of movement, this includes an joint system (100, 50) comprising a joint linkage 100 operated by a vertical actuator 50, in the shape of a vertical rod 50.

Figure 10:
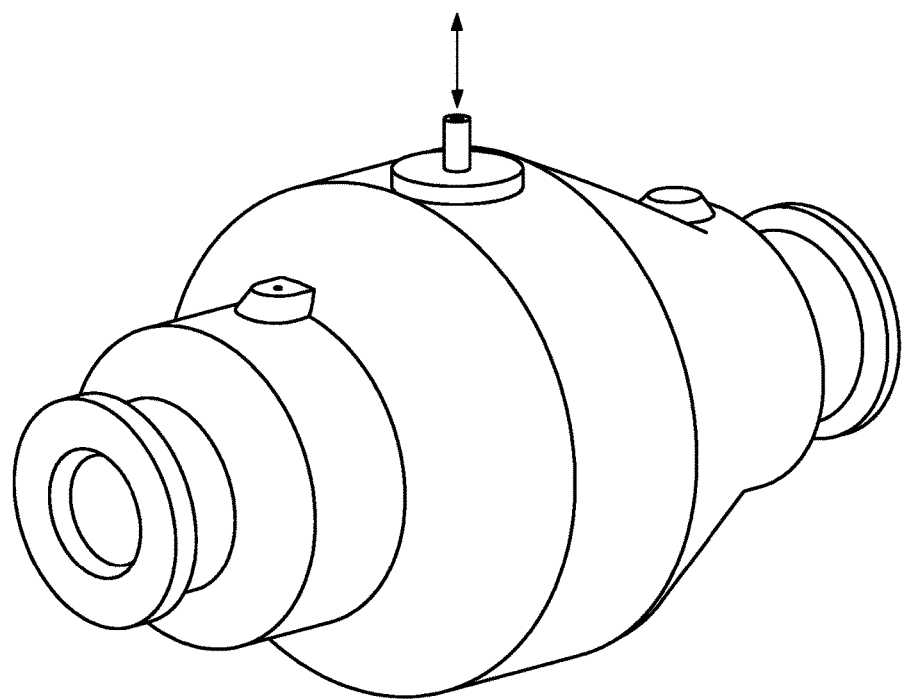
FIG. 10 shows a view in axonometry of the valve subject of the invention, displaying the vertical rod 50 to which the double direction of the arrow of the motion has been applied and operable from any type of external linear actuator.

The vertical rod 50 is placed slidingly into an appropriate seat obtained always in the part 6 of the valve. Said housing seat of the vertical rod intercepts the seat 30 into which the piston slides in a perpendicular manner with respect to the longitudinal axis of the valve. An end of the vertical rod 50 (the one exiting from the body of the valve) can therefore be connected to any type of external actuator that causes a reciprocation of the rod 50 (see for example also FIG. 10). The opposite end, that is the one that terminates into the seat 30, is connected to the linkage 100 described in detail right afterwards.

Figure 3:
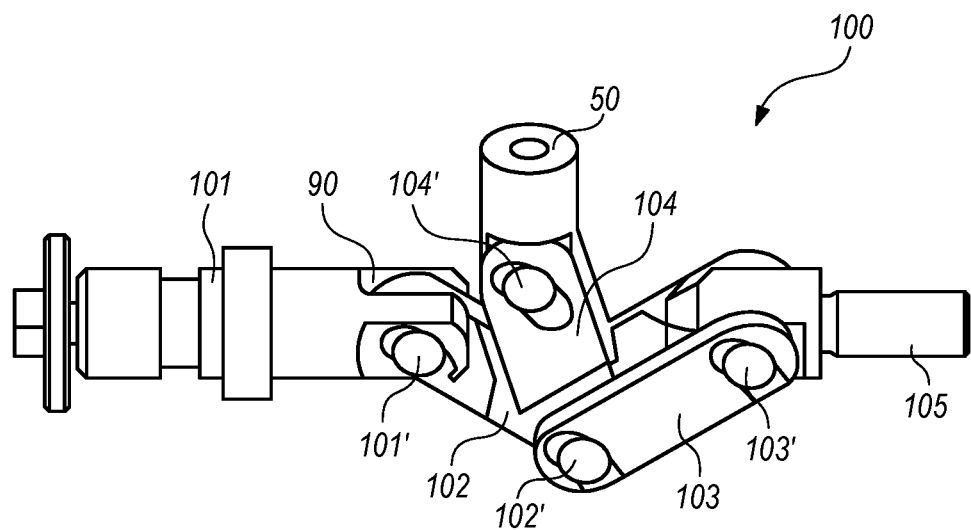
FIG. 3 shows in detail the components of the joint linkage 100 in a first possible embodiment.

The linkage is connected to a fixed point, for example to the bottom base of the channel 30, by means of an attachment 101 that is fixed to the wall (see FIG. 3).

In particular, a first rod 102 is connected by one of its ends to said end of the attachment 101. The connection point in FIG. 3 is identified with the number 101' and said connection is naturally rotatable, in the sense that the rod 102 is pivoted and therefore free to rotate around said point 101'.

The opposite end of the rod 102 pivots with a further rod 103 by means of the pivot 102'. On the opposite part to said pivot 102', the rod 103 connects with the piston 40 through an end 105 which can be an integral end of the piston or a separate part that can be connected to it. A rod 104 is also pivoted in the common point 102' on one part and to the end of the rod 50 on the opposite part, in such a way as to transmit to the two rods (102, 103) of the linkage the alternate motion of the rod 50.

In particular, the rod 104 results packed between the rod 102 and the rod 103. The opposite end of the rod 104 is instead pivoted in the point 104' with the end of the vertical rod 50.

The linkage 100, as it is clear for example in FIG. 1 or in FIG. 2, is operable in the plane of section of FIG. 2 or of FIG. 3. Said rods are therefore rotatable around orthogonal pivoting axis to the plane of section of FIG. 1 or FIG. 2.

In order to allow these connections in succession, the solution of FIG. 3 therefore includes that the rod 102 is a single arm whose end is in fact inserted into a cut 90 obtained at the end of the attachment 101 and hinged to it by means of the rotatable pivot 101'. The remaining rods have the shape of double rods coupled by means of the relative rotatable pivots.

In particular, the rod 104 is in fact constituted by two coupled units, by means of the pivots 104' and 102', to the two milled faces of the end of the rod 50 on one part and to the two milled faces that constitute the rod 102 on the opposite part. Likewise, the rod 103 is in fact constituted by two rods coupled always by means of the pivots 102' and 103' respectively to the milled faces of the two rods 104 and to the milled end of the attachment to the piston 40.

The articulated linkage 100, which transforms the vertical translation motion of the rod 50 in a reciprocation translation motion of the piston 40 along the longitudinal axis of the valve, includes, as described, a further rod 104 that in fact is interposed between the rod 50 and the part of linkage constituted by the rods 102 and 103 hinged in succession between them.

This solution, although more cumbersome and structurally more complex, allows to unload significantly the structural elements of the linkage since to each rod arrives a minor load.

A simpler alternative solution could anyway include a direct connection of a single rod 103 with the end of the god 50, thus eliminating both the rod 104 and the rod 102 connected with the attachment 101 (and therefore eliminating also the attachment 101 that would result superfluous at this point). This solution is functional and simplifies significantly the overall structure of the linkage, since in fact it reduces the encumbrance and the structural complexity of it. This has anyway the considerable drawback of loading the linkage elements much more.

Figure 6:
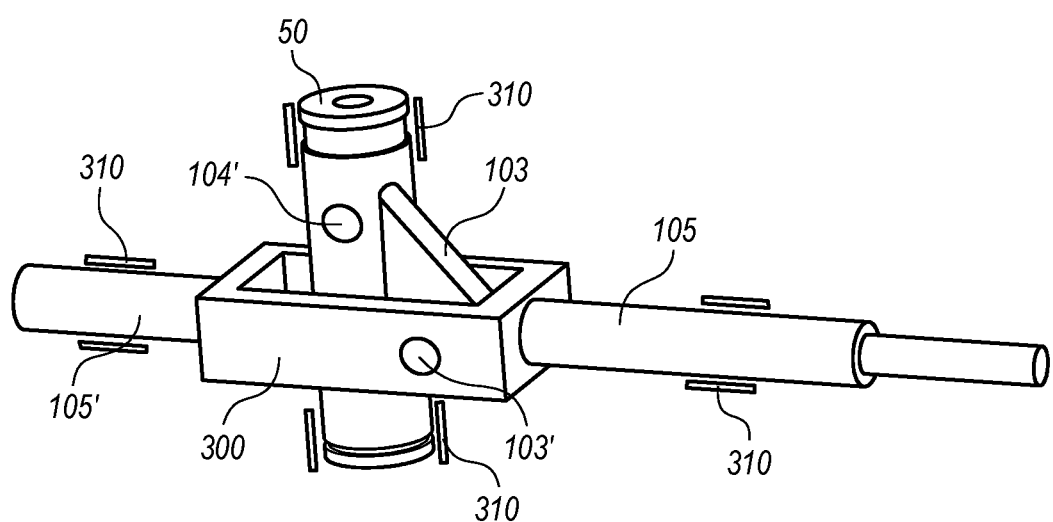
FIG. 6 shows an alternative solution of the linkage wherein a direct connection is realized between actuator and rod 103 by means of an appropriate push element (105', 300, 105)

To that aim, FIG. 6 highlights a solution that allows to reduce such loads bi-supporting the rods with appropriate bushings 310.

The simple end 105 is now substituted by a push element of the piston (105, 105', 300) comprising a passing slot into which the end of the rod (50) is inserted slidingly and with two extensions or ends (105', 105) opposed between them.

The slot has such a length as to allow a sliding of the end 50 along it.

Said opposed extensions (105, 105') allow the application of guide bushings 310 that thus guide and damp the loads during the horizontal translation motion that acquires said push element through the action of the alternate motion of the end of the rod 50 coupled to the rod 103.

In particular, a perimeter delimitation 300 is included, for example in the shape of a rectangle, which delimits and forms said slot into which the rod 103 is held. From a face of the perimeter delimitation 300, external to the slot, emerges the extension or terminal 105 and from the opposite face emerges the other extension 105'.

The rod 103, arranged into the slot formed by the perimeter delimitation 300, is hinged in the point 103' to the internal wall of the slot and on the opposite part to the rod 50 (in the point 104').

The end 50, however, is longer now with respect to the preceding solution in such a way that there is one of its parts that exceeds that goes through the slot entirely, exiting on the opposite part.

In this manner, bushings 310 are applied also to the terminal part of the rod 50 as per FIG. 6.

The kinematic functioning is identical to what has been described above in the sense that the alternate motion of the rod 50, through the rod 103, allows the push element to acquire a forward and backward reciprocation motion that pushes the piston towards the closing position and retracts it. The slot must have such a length as to allow the rod 50, during the motion, to oscillate into it along its length.

This solution, through the ends 105 and 105', allows to apply guide bushings 310 that damp the loads supported by the linkage 103.

The further solution of the longer rod 50 advantageously allows to apply further bushings 310 also in its terminal part and in the attachment point near the hinging (104').

Having described the elements of the invention from the structural point of view, we now pass onto a description of the functioning of it.

FIG. 1 shows a phase wherein the rod 50 is pushed vertically in the direction of the arrow with a pre-determined force F, for example through an external actuator. In this configuration, the linkage is such as to cause a motion of the piston that causes the opening of the entire fluid circulating conduit. In particular, the piston 40 moves away from the seal 32, thus allowing the fluid to circulate towards the exit 3, deflowing along the part of channel 7'. This takes place because the particular type of linkage 100 is such that the two rods 102 and 103, hinged in succession between them, reclose reciprocally one towards the other in correspondence of the application of a force F directed towards the hinging 102'.

As per FIG. 2, a motion in the opposite direction of the rod 50 permits that the linkage pushes the piston against the ring 32 until stopping against it, obstructing the entire path. In particular, the two rods 102 and 103 open reciprocally.

FIG. 4 shows the closing phase wherein the piston goes against the seal 32. Also in this figure it is highlighted the pre-chosen solution for the spacer 31 which includes openings for the passage of the fluid in the annular part of path. The same figure shows clearly how in this position the fluid circulation is interrupted. The piston is mainly inserted in the ring 31, obstructing the lateral openings.

FIG. 5 shows the other extreme position wherein the rod 50 is pushed towards the body of the valve, causing the moving away motion of the piston from the ring. In this position, the figure shows clearly the deflow of the fluid.

As shown in FIGS. 4 and 5 a further technical solution foresees that the piston 40 is holed axially (one or more holes). In use, this solution allows, as shown in FIG. 4 and in FIG. 5, the passage of a certain quantity of fluid in the channel 30, both in the opening phase and in the closing phase of the path. This keeps the piston immersed in the fluid and therefore in hydrostatic equilibrium of pressures. In this manner, the force F necessary to push the piston in closing position is significantly reduced. In the same way, the opening motion does not risk to generate strong return shocks.

Figure 7:
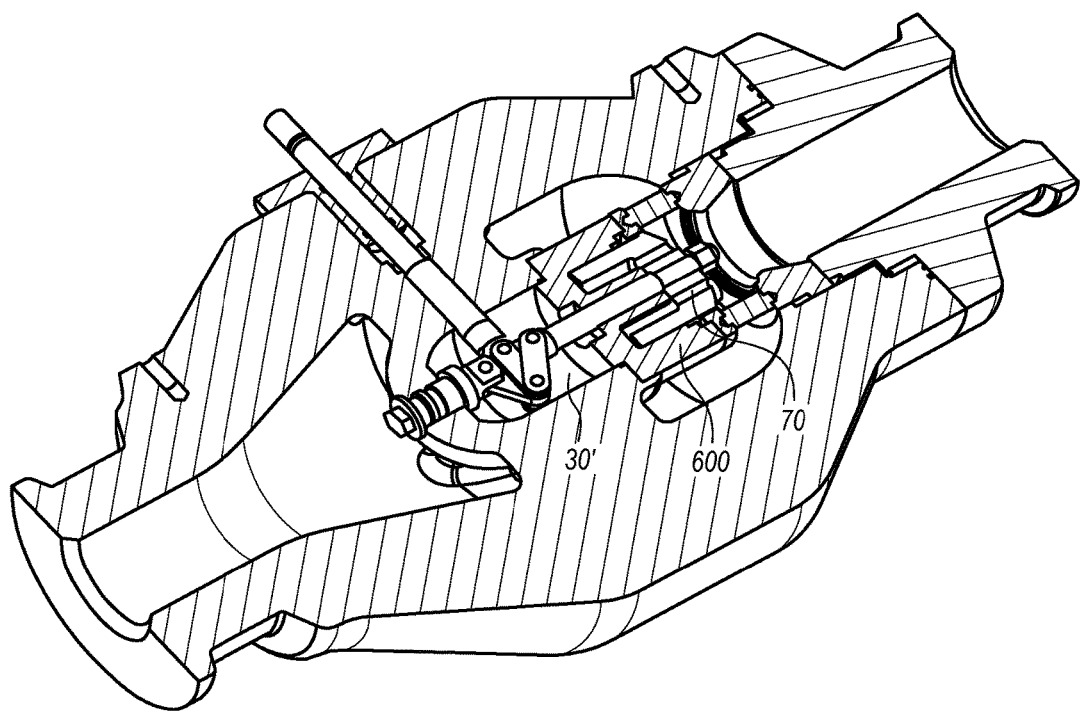
FIG. 7 shows another variant wherein, independently of the fact that there is a linkage with a single rod or more rods, the chamber 30 becomes isolated to avoid that the linkage itself results immersed in the fluid circulating in the valve.

As shown in FIG. 7, in case the contamination of the linkage with the process fluid present in the conduit wants to be avoided, it is possible to insert a further plug element 600 that is capable of isolating the channel 30. The figure shows the isolated linkage in its appropriate chamber 30', while the piston is normally sliding into its seat formed by the plug element. Always in FIG. 7 the openings 70 through which the fluid enters are shown in such a way that, in an analogous way to the solution of FIG. 4, the piston results anyway immersed in the conduit fluid.

Figure 8:
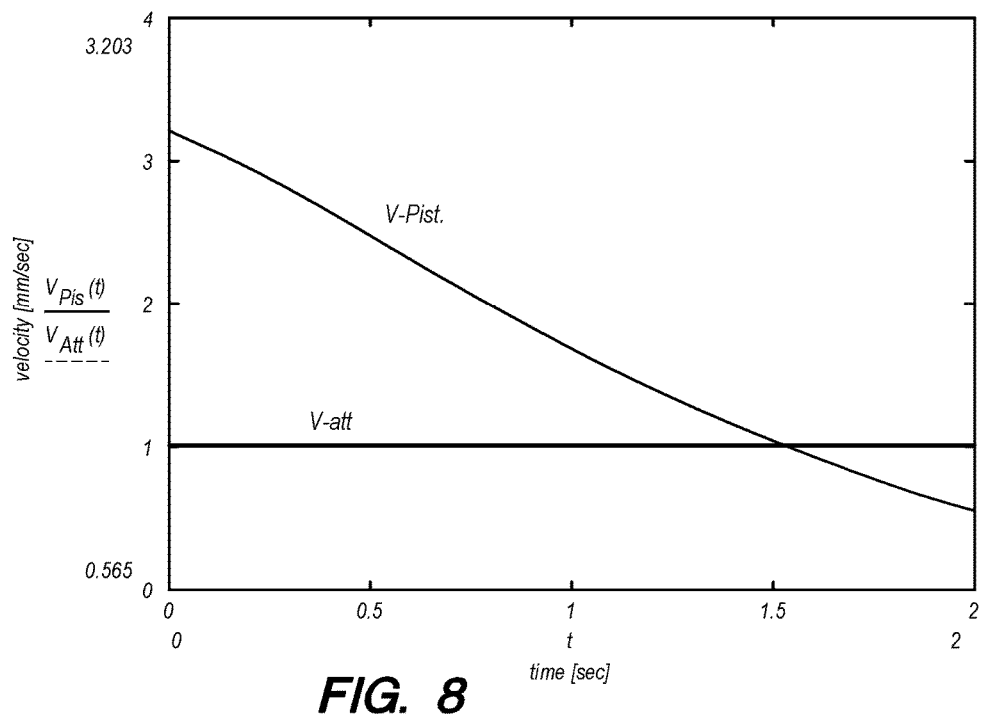
FIG. 8 and FIG. 9 show two graphics displaying graphically experimental data of force and speed obtained on the piston on the basis of the force and speed impressed to the rod 50 of actuation of the piston itself.
Figure 9:
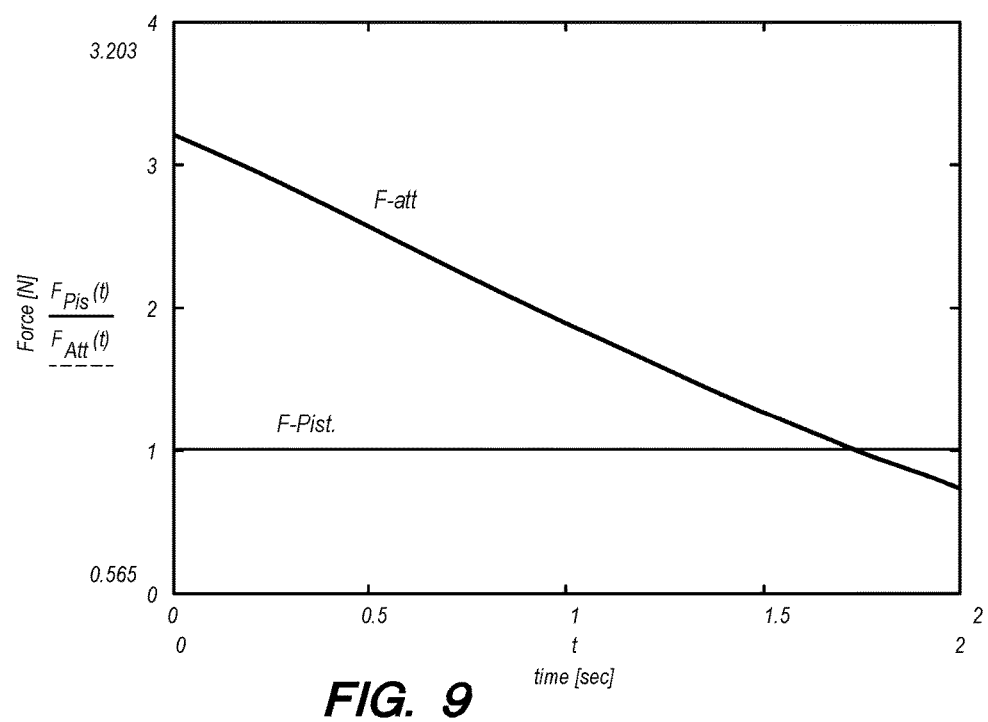

The two graphics of FIGS. 8 and 9 show experimental data that clearly highlight some significant advantages obtained with the present invention.

In particular, FIG. 8 shows how, with a constant actuation speed of the rod 50, the speed of approach of the piston towards the closing position decreases according to the curve represented. FIG. 9 presents values in ordinates of speed in [mm/s] and in x-coordinates the path covered in [mm].

Likewise, a constant acting force on the piston is kept, despite the force applied to the rod 50, for example through an appropriate actuator, is decreasing according to the curve of FIG. 9 represented.

The graphic of FIG. 9 shows in ordinate the force in [N] and in x-coordinates the section in [mm].

In such a sense, therefore, the approach of the piston is significantly more controlled.

Although the present invention is preferably addressed to conduits of big size, that is conduits for the transport of gas in gas pipelines or for oil extraction, the valve described here can be realized in any size and therefore can be adapted to any type and size of conduit.

The invention claimed is:

1. A control valve comprising:
a passage path for a fluid inside the control valve and that puts in communication an inlet with an outlet;
an obstruction element arranged so as to be mobile between a closing position, in which it obstructs the passage path impeding the passage of the fluid from the inlet towards the outlet, and an opening position, in which it allows said passage, and;
movement means for operating the movement of the obstruction element between said opening position and said closing position and vice-versa;
said movement means comprising a joint linkage and an actuator element reciprocable and connected to the joint linkage in such a way that, in correspondence to the reciprocation of the actuator element, the joint linkage extends and contracts causing a reciprocation of the obstruction element to which the joint linkage is connected,
wherein the joint linkage is configured in such a manner that with a constant actuation speed of the actuator element, the speed of approach of the obstruction element towards the closing position decreases;
wherein the joint linkage comprises a rod that is hinged directly from one side to the free end of the actuator element so that the opposite end of the rod exercises a reciprocal push on the obstruction element as a consequence of the reciprocation of the actuator element; and
a push element of a piston, provided with an end connected to the obstruction element, the push element comprising a passing slot into which the end of the actuator element is inserted in a passing manner in such a way as to reciprocate and wherein the rod is placed into the slot and hinged from one side to a point of the actuator element and from the opposite side to a wall of the slot and wherein one or more bushings are included, arranged in the end and/or in the terminal end of the actuator element.

2. The control valve, according to claim 1, wherein the actuator element has such a length that its terminal part exits from the opposite side of the slot into which it is inserted in such a way as to allow the application of a further bushing in said exit terminal part.

3. A control valve comprising:
a passage path for a fluid inside the control valve and that puts in communication an inlet with an outlet;
an obstruction element arranged so as to be mobile between a closing position, in which it obstructs the passage path impeding the passage of the fluid from the inlet towards the outlet, and an opening position, in which it allows said passage;
movement means for operating the movement of the obstruction element between said opening position and said closing position and vice-versa;
said movement means comprising a joint linkage and an actuator element reciprocable and connected to the joint linkage in such a way that, in correspondence to the reciprocation of the actuator element, the joint linkage extends and contracts causing a reciprocation of the obstruction element to which the joint linkage is connected;
wherein the joint linkage is configured in such a manner that with a constant actuation speed of the actuator element, the speed of approach of the obstruction element towards the closing position decreases; and
a seat, internal to the valve, into which the obstruction element is placed slidingly and wherein the joint linkage is arranged into said seat and is interposed between the obstruction element and a back wall of the seat;
wherein a part of the passage path comprises an annular branch that rotates around the seat to then converge at the path.

* * * * *